United States Patent
Lee et al.

(10) Patent No.: US 8,338,995 B2
(45) Date of Patent: Dec. 25, 2012

(54) COOLING FLUID PATH STRUCTURE FOR SUPERCONDUCTION ROTATING MACHINE

(75) Inventors: Jung Hyun Lee, Changwon-si (KR); Je Heon Jung, Changwon-si (KR); Woon Sik Kwon, Changwon-si (KR); Heui Joo Park, Gimhae Si (KR); Chi Hwan Lee, Busan (KR); Yeong Chun Kim, Changwon-si (KR)

(73) Assignee: Doosan Heavy Industries & Construction Co., Ltd., Changwon (KR)

( * ) Notice: Subject to any disclaimer, the term of this patent is extended or adjusted under 35 U.S.C. 154(b) by 542 days.

(21) Appl. No.: 12/650,312

(22) Filed: Dec. 30, 2009

(65) Prior Publication Data

US 2011/0092371 A1 Apr. 21, 2011

(30) Foreign Application Priority Data

Oct. 21, 2009 (KR) .................... 10-2009-0100039

(51) Int. Cl.
  *H02K 9/00* (2006.01)
(52) U.S. Cl. ............................................. 310/54; 310/52
(58) Field of Classification Search .............. 310/52–59, 310/61, 60 A
  See application file for complete search history.

(56) References Cited

U.S. PATENT DOCUMENTS

| | | | | | |
|---|---|---|---|---|---|
| 3,679,920 A | * | 7/1972 | MacNab et al. | ................. | 310/10 |
| 3,764,835 A | * | 10/1973 | Luck et al. | ..................... | 310/52 |
| 4,020,371 A | * | 4/1977 | Gillet et al. | ..................... | 310/52 |
| 4,039,870 A | * | 8/1977 | Sterrett | ........................... | 310/52 |
| 4,076,988 A | * | 2/1978 | Litz | .................................. | 310/52 |
| 4,101,793 A | * | 7/1978 | Berthet et al. | .................. | 310/52 |
| 4,117,357 A | * | 9/1978 | Baumann | ........................ | 310/52 |
| 4,236,091 A | * | 11/1980 | Kutateladze et al. | ........... | 310/64 |
| 4,275,320 A | * | 6/1981 | Baumann et al. | ................ | 310/52 |
| 4,822,772 A | * | 4/1989 | Huson | ............................ | 505/211 |

FOREIGN PATENT DOCUMENTS

| | | |
|---|---|---|
| JP | 2005-224001 A | 8/2005 |
| JP | 2007-089314 A | 4/2007 |
| KR | 10-2006-0092097 A | 8/2006 |

* cited by examiner

*Primary Examiner* — Thanh Lam
(74) *Attorney, Agent, or Firm* — Birch, Stewart, Kolasch & Birch, LLP (57) ABSTRACT

Disclosed is a cooling fluid path structure for a superconducting rotating machine, which includes: a fixed inlet fluid path fixed together with the fluid supply means; a rotating inlet fluid path adjacently connected to an outlet of the fixed inlet fluid path, which is for transferring the cooling fluid transferred from the fixed inlet fluid path to a cooling fluid path inlet provided in the rotor while rotating together with the rotor; a rotating outlet fluid path rotating together with the rotor, to which the cooling fluid discharged from a cooling fluid path outlet of the rotor is transferred; and a fixed outlet fluid path adjacently connected to the rotating outlet fluid path, which is for transferring the cooling fluid transferred from the rotating outlet fluid path to the fluid supply means while being fixed together with the fluid supply means, wherein the rotating outlet fluid path and the fixed outlet fluid path are disposed in such a manner that they surround outside of the rotating inlet fluid path and the fixed inlet fluid path.

5 Claims, 6 Drawing Sheets

COOLING FLUID PATH STRUCTURE FOR SUPERCONDUCTION ROTATING MACHINE

BACKGROUND OF THE INVENTION

1. Field of the Invention

The present invention relates to a rotor cooling device of a superconducting rotating machine (e.g., power generator or electric motor). More particularly, the present invention relates to a piping configuration of a cooling line through which a cooling fluid passes, in a rotor cooling device of a superconducting rotating machine, based on a forced convection-using fluid circulation method.

2. Description of the Prior Art

A superconducting rotating machine (e.g., power generator or electric motor) is a rotating machine including a rotor with a superconducting wire, instead of with a general copper wire, and thus can be manufactured as a smaller and lighter machine than a conventional rotating machine. On the outer surface of the rotor for the superconducting rotating machine, a bobbin block around which the superconducting wire is to be wound is provided. Since such a superconducting rotating machine requires the use of superconductivity, the rotor has to be cooled to a superconducting temperature.

A rotor cooling method is divided into a natural convection-using method and a forced convection-using method.

The forced convection-using method is divided into a method of circulating a low temperature gas by a blower, and a method of circulating a low temperature cooling fluid by a fluid supply means.

The gas circulating method is not subjected to gravity, but is accompanied with problems, such as a low cooling efficiency, and leakage of high pressure gas. Meanwhile, the liquid circulating method has a high cooling efficiency due to the use of evaporation latent heat by a phase change (from liquid to gas), but may cause non-uniformity in the flow by the fluid's own gravity.

Meanwhile, a cooling method using a fluid (e.g., gas or liquid) forced convection has a structure where a rotor is separated from the fluid supply means side. In the structure, a cooling fluid path at the fluid supply means side is fixed, and a cooling fluid path at the rotor side is rotated at a high speed.

Accordingly, between the cooling fluid path at the high-speed rotating superconducting rotor side, and the cooling fluid path at the fixed fluid supply means side, a special connection, such as an interconnecting dynamic sealing device, is required. However, in such a special connection, significant heat loss is caused, and thereby there is a problem in that an expensive cryogenic refrigerant is required to be occasionally filled. Besides, the reliability may be reduced in long time operation.

Therefore, in the fluid forced convection-based cooling device of a superconducting rotating machine, it is required to improve the cooling fluid path structure of the connection between the cooling fluid path at the fixed fluid supply means side and the cooling fluid path at the rotating rotor side.

SUMMARY OF THE INVENTION

Accordingly, the present invention has been made to solve the above-mentioned problems occurring in the prior art, and the present invention provides an improved cooling fluid path structure in a fluid forced convection-based cooling device of a superconducting rotating machine. More particularly the present invention provides an improved cooling fluid path structure of a connection between a rotating rotor-side cooling fluid path and a fixed fluid supply means-side cooling fluid.

In order to achieve the object of the present invention, in a cooling fluid path structure of a superconducting rotating machine, the cooling fluid path structure being for cooling a rotor by circulating the cooling fluid between a fixed fluid supply means and a rotating rotor, a cooling fluid outlet path is disposed in such a manner that it surrounds the outside of a inlet path.

More particularly, the cooling fluid path structure of the present invention includes: a fixed inlet fluid path fixed together with the fluid supply means, to which the cooling fluid discharged from the fluid supply means is transferred; a rotating inlet fluid path adjacently connected to an outlet of the fixed inlet fluid path, which is for transferring the cooling fluid transferred from the fixed inlet fluid path to a cooling fluid path inlet provided in the rotor while rotating together with the rotor; a rotating outlet fluid path rotating together with the rotor, to which the cooling fluid discharged from a cooling fluid path outlet of the rotor is transferred; and a fixed outlet fluid path adjacently connected to the rotating outlet fluid path, which is for transferring the cooling fluid transferred from the rotating outlet fluid path to the fluid supply means while being fixed together with the fluid supply means, wherein the rotating outlet fluid path and the fixed outlet fluid path are disposed in such a manner that they surround outside of the rotating inlet fluid path and the fixed inlet fluid path.

Also, the rotating outlet fluid path, the fixed outlet fluid path, the rotating inlet fluid path, and the fixed inlet fluid path are preferably concentrically disposed.

Also, a plurality of inlets for cooling fluid paths coming in the rotor may be provided. In this case, the rotating inlet fluid path branches off and transfers the cooling fluid transferred from a single outlet of the fixed inlet fluid path into the plurality of inlets for the cooling fluid paths of the rotor.

Also, a plurality of outlets for cooling fluid paths coming out of the rotor may be provided. In this case, the rotating outlet fluid path receives cooling fluids discharged from the plurality of outlets for the cooling fluid paths of the rotor, and puts together the cooling fluids in a single fluid path.

Also, the cooling fluid path structure the present invention may further includes dynamic sealing means.

The dynamic sealing means are for sealing the cooling fluid, which are disposed at an adjacent portion between the fixed inlet fluid path and the rotating inlet fluid path, and at an adjacent portion between the rotating outlet fluid path and the fixed outlet fluid path while fixedly supporting the fixed inlet fluid path and the fixed outlet fluid path and rotatably supporting the rotating inlet fluid path and the rotating outlet fluid path.

As described above, according to the present invention, the rotating outlet fluid path 40 and the fixed outlet fluid path 50 are disposed in such a manner that they can surround the outside of the rotating inlet fluid path 20 and the fixed inlet fluid path 10. More preferably, through the concentric disposition of the rotating outlet fluid path 40, the fixed outlet fluid path 50, the rotating inlet fluid path 20, and the fixed inlet fluid path 10, the inlet fluid paths and the outlet fluid paths for the cooling fluid are disposed at the same positions in all directions with respect to the central axis. This secures the uniformity in the cooling property.

Also, according to the present invention, the rotating inlet fluid path 20 splits the single fixed inlet fluid path 10 into a plurality of fluid paths, and the rotating outlet fluid path 40 puts together a plurality of split fluid paths in a single fluid path of the fixed outlet fluid path 50. Thus, a plurality of inlets/outlets for cooling fluid paths coming in/out of the rotor may be provided, and also the number of the inlets/outlets may be variably set.

Accordingly, the disposition of a cooling fluid path passing through the bobbin blocks 110(110-1, 110-2, . . . 110-6) of the rotor 100 may be variously realized. Since the piping configuration of a cooling fluid path can be variously set, it is possible to more uniformly carry out the cooling on respective bobbin blocks according to various environments and conditions. Besides, the adaptability can be improved.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, an exemplary embodiment of the present invention will be described in detail with reference to the accompanying drawings.

Figure 1:
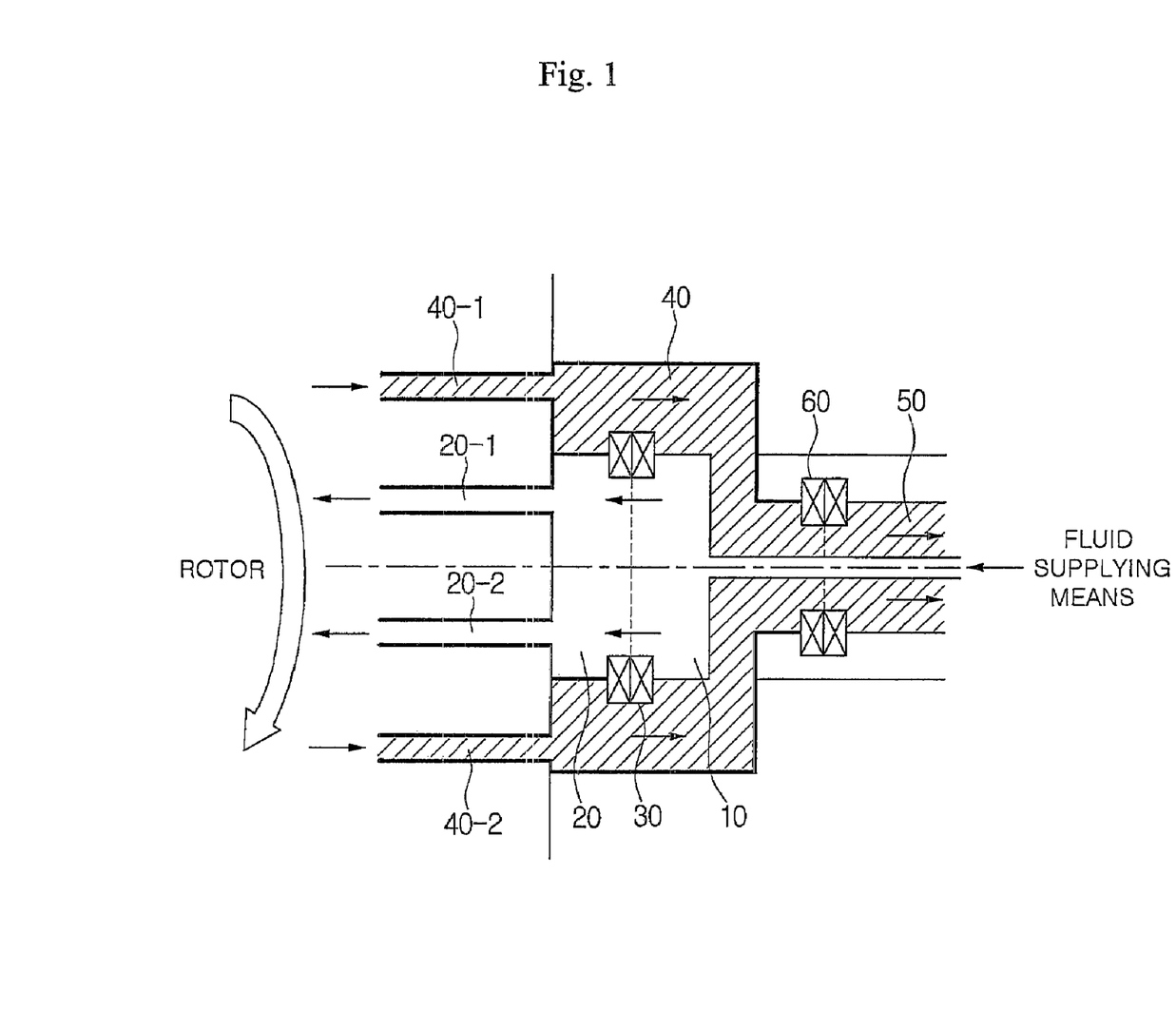
FIG. 1 shows a cross-sectional view illustrating a cooling fluid path structure of a superconducting rotating machine, according to the present invention.
Figure 2:
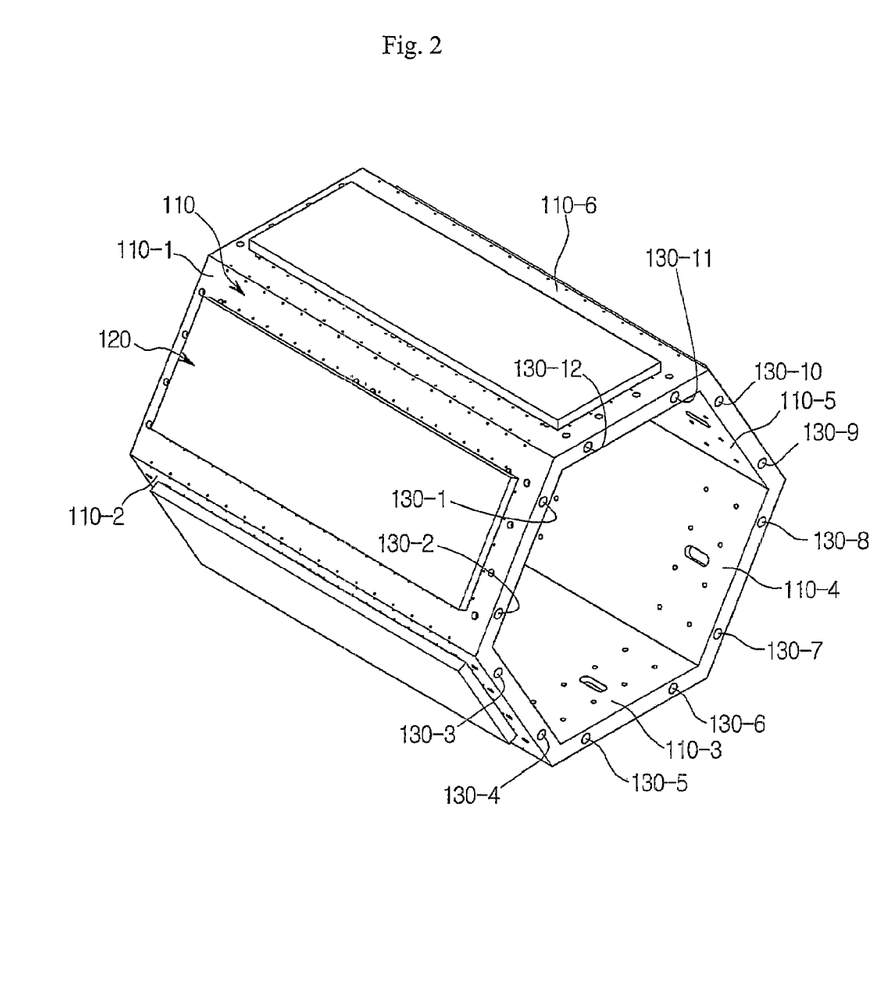
FIG. 2 shows a perspective view illustrating one embodiment of a rotor for a 6-pole superconducting rotating machine.

FIG. 1 shows a cross-sectional view illustrating the cooling fluid path structure according to the present invention, and FIG. 2 shows one example of a rotor for a superconducting rotating machine, to which a cooling fluid path of FIG. 1 is applied. In FIG. 2, the rotor has 6 poles. The number of poles of a rotor may be variable.

First, as shown in FIG. 2, a 6-pole rotor includes 6 bobbin blocks 110(110-1, 110-2, . . . 110-6) and the bobbin blocks 110(110-1, 110-2, . . . 110-6) include bobbins 120(120-1, 120-2, . . . 120-6) around which a superconducting wire is to be wound. Also, at the end portion of each of the bobbin blocks 110(110-1, 110-2, . . . 110-6), 2 cooling fluid path holes (inlet and outlet) are provided, and a total of 12 cooling fluid path inlets and outlets 130(130-1, 130-2, . . . 130-12) are formed.

The cooling fluid path structure of a superconducting rotating machine, according to the present invention, is provided between a fixed fluid supply means (e.g., a pump, a blower, etc.—a fixed side) and a rotating rotor (e.g., a rotor—a rotating side) to cool the rotor of the superconducting rotating machine through the circulation of a cooling fluid. The fluid supply means depends on the kind of refrigerant. When the refrigerant is a gas, it may be a blower, and when the refrigerant is a liquid, it may be a pump. The cooling fluid path is placed in a vacuum condition so as to block the convective (or conductive) heat transfer coming in from the outside.

As shown in FIG. 1, the cooling fluid path according to the present invention includes a fixed inlet fluid path 10, and a rotating inlet fluid path 20, a rotating outlet fluid path 40, and a fixed outlet fluid path 50. As shown, in the structure of the cooling fluid path according to the present invention, the rotating outlet fluid path 40 and the fixed outlet fluid path 50 are disposed in such a manner that they can surround the outside of the rotating inlet fluid path 20 and the fixed inlet fluid path 10.

Also, between the fixed inlet fluid path 10 and the rotating inlet fluid path 20, and between the rotating outlet fluid path 40 and the fixed outlet fluid path 50, a first dynamic sealing means 30 and a second dynamic sealing means 60 are provided, respectively.

Hereinafter, elements of the structure will be described in detail.

The fixed inlet fluid path 10, together with a fluid supply means (e.g., a pump or a blower), is fixed, and to the fixed inlet fluid path 10, a cooling fluid discharged from the fluid supply means is transferred.

The rotating inlet fluid path 20 is adjacently connected to the outlet of the fixed inlet fluid path 10 and transfers the cooling fluid transferred from the fixed inlet fluid path 10 to the cooling fluid path inlet 130 (one selected from 130-1, 130-2, . . . 130-12 in FIG. 2) provided in the rotor 100 (FIG. 2). The rotating inlet fluid path 20 rotates with the rotor 100.

The first dynamic sealing means 30 fluid-sealably connects the fixed inlet fluid path 10 with the rotating inlet fluid path 20. In other words, the first dynamic sealing means 30 is disposed at the adjacent portion between the fixed inlet fluid path 10 and the rotating inlet fluid path 20. Also, the first dynamic sealing means 30 seals the cooling fluid while fixedly supporting the fixed inlet fluid path 10 side and rotatably supporting the rotating inlet fluid path 20 side.

Meanwhile, the cooling fluid, which has flown into the cooling fluid path inlet 130 (one selected from 130-1, 130-2, . . . 130-12 in FIG. 2) of the rotor 100 from the rotating inlet fluid path 20, cools the superconducting wire wound around the bobbins 120 while passing through the inside of respective bobbin blocks 110(110-1, 110-2, . . . 110-6). Then, the cooling fluid is discharged to the cooling fluid path outlet 130 (selected from 130-1, 130-2, . . . 130-12, except for the one selected as the inlet) of the rotor 100.

To the rotating outlet fluid path 40, the cooling fluid discharged from the cooling fluid path outlet 130 (selected from 130-1, 130-2, . . . 130-12, except for the one selected as the inlet) of the rotor 100 is transferred. The rotating outlet fluid path 40 rotates with the rotor.

The fixed outlet fluid path 50, adjacently connected to the rotating outlet fluid path 40, transfers the cooling fluid transferred from the rotating outlet fluid path 40 to the fluid supply means. The fixed outlet fluid path 50 is fixed together with the fluid supply means.

The second dynamic sealing means 60 fluid-sealably connects the fixed outlet fluid path 50 with the rotating outlet fluid path 40. In other words, the second dynamic sealing means 60 is disposed at the adjacent portion between the fixed outlet fluid path 50 and the rotating outlet fluid path 40. Also, the second dynamic sealing means 60 seals the cooling fluid while fixedly supporting the fixed outlet fluid path 50 side and rotatably supporting the rotating outlet fluid path 40 side.

As shown, the rotating outlet fluid path 40 and the fixed outlet fluid path 50 are disposed in such a manner that they can surround the outside of the rotating inlet fluid path 20 and the fixed inlet fluid path 10.

Also, preferably, the rotating outlet fluid path 40, the fixed outlet fluid path 50, the rotating inlet fluid path 20, and the fixed inlet fluid path 10 are concentrically disposed.

Through the above described configuration, the inlet fluid paths and the outlet fluid paths for the cooling fluid are disposed at the same positions in all directions with respect to the central axis. This secures the uniformity in the cooling property.

Also, according to a preferred embodiment, a plurality of inlets and outlets for cooling fluid paths coming in/out of the rotor may be provided.

For example, FIG. 1 shows the case where two inlets or two outlets for cooling fluid paths coming in/out of the rotor are provided, in which the rotating inlet fluid path 20 splits the cooling fluid transferred from a single outlet of the fixed inlet fluid path 10, and connects it to two cooling fluid path inlets provided in the rotor via two fluid paths 20-1 and 20-2.

In the same manner, the rotating outlet fluid path 40 has a configuration in which two fluid paths 40-1 and 40-2 are put together in a single fluid path in order to receive the cooling fluid discharged from two cooling fluid path outlets of the rotor.

Meanwhile, in the illustration shown in FIG. 1, there are two inlets/outlets for cooling fluid paths coming in/out of the rotor, but the present invention is not limited thereto. The number of inlets/outlets may be variable.

Meanwhile, the number of poles in a superconducting rotating machine may be variable according to the application.

As one embodiment, in a case of a rotor with 6 poles, shown in FIG. 2, the piping configuration of a cooling fluid path will be described with reference to FIG. 3.

As shown in FIG. 2, the 6-pole rotor includes 6 bobbin blocks 110(110-1, 110-2, . . . 110-6), and the bobbin blocks 110(110-1, 110-2, . . . 110-6) include bobbins 120(120-1, 120-2, . . . 120-6) around which a superconducting wire is to be wound.

Also, at the end portion of each of the bobbin blocks 110(110-1, 110-2, . . . 110-6), 2 cooling fluid path holes (e.g., inlet and outlet) are provided, and a total of 12 cooling fluid path inlets and outlets 130(130-1, 130-2, . . . 130-12) are formed.

In such a case, as shown in FIGS. 3 to 6, it is possible to variously dispose cooling fluid paths passing through the bobbin blocks 110(110-1, 110-2, . . . 110-6) of the rotor 100.

Figure 3:
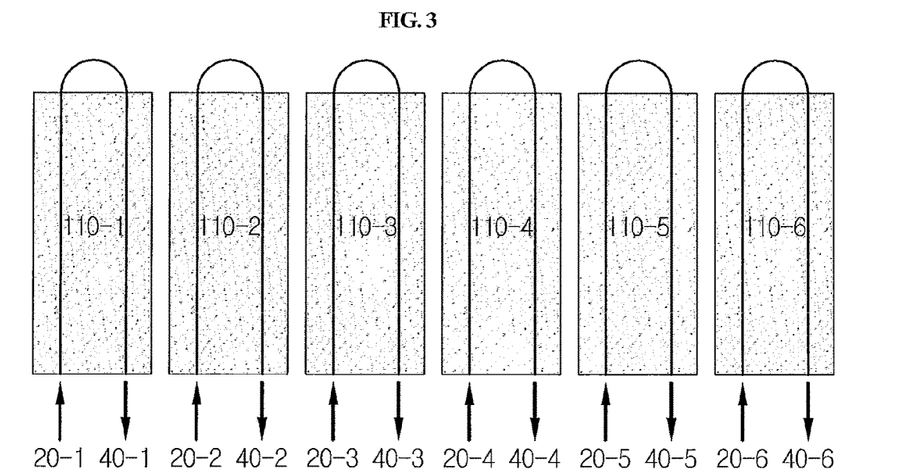
FIGS. 3 to 6 show various embodiments of a cooling fluid path piping method applicable to the 6-pole rotor shown in FIG. 2.
Figure 4:
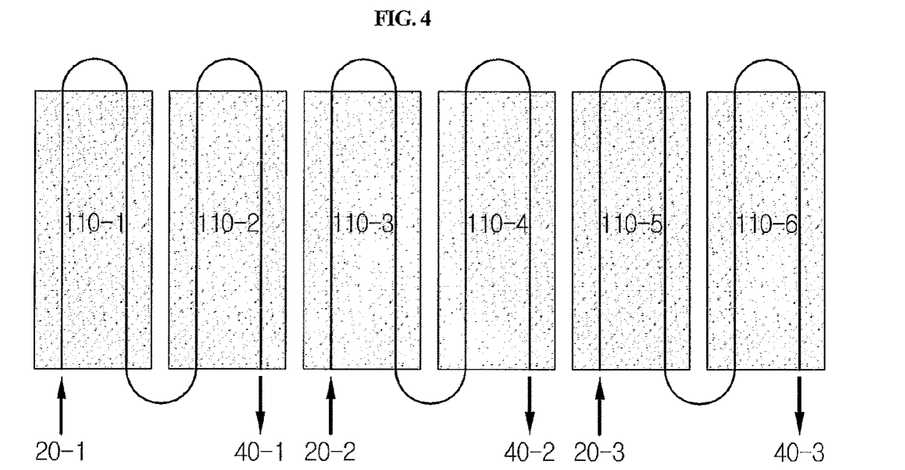
Figure 5:
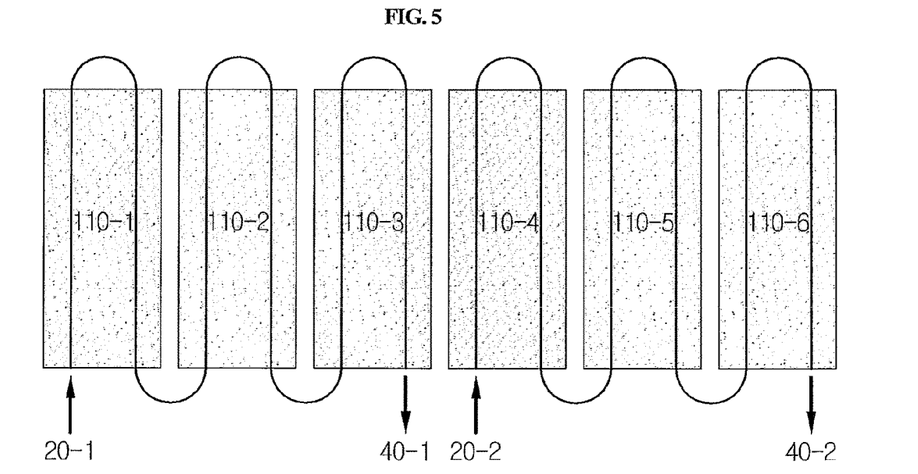
Figure 6:
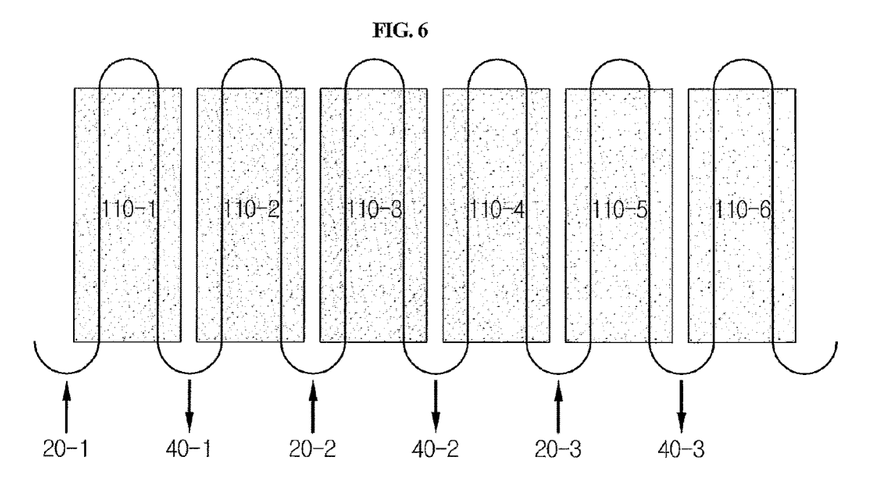

In other words, FIG. 3 shows the case where 6 inlets and 6 outlets for cooling fluid paths coming in/out of the bobbin blocks 110(110-1, 110-2, . . . 110-6) of the rotor 100 are provided (6 in-6 out), FIGS. 4 and 6 show the cases where 3 inlets and 3 outlets for cooling fluid paths are provided (3 in-3 out), and FIG. 5 shows the case where 2 inlets and 2 outlets for cooling fluid paths are provided (2 in-2 out).

In FIG. 3, since there are 6 inlets and 6 outlets for cooling fluid paths coming in/out of the rotor 100, the single rotating inlet fluid path 20 in FIG. 1 is split into 6 fluid paths 20-1, 20-2, . . . 20-6. Also, the split 6 fluid paths 40-1, 40-2, . . . 40-6 of the rotating outlet fluid path 40 are put together in a single fluid path.

In the same manner as FIG. 3, in FIGS. 4 and 6, and FIG. 5, the numbers of inlets/outlets for cooling fluid paths coming in/out of the rotor are set as 3 (20-1, 20-2, 20-3; 40-1, 40-2, 40-3) and 2 (20-1, 20-2; 40-1, 40-2), respectively.

As described above, since the piping configuration of a cooling fluid path can be variously set, it is possible to more uniformly carry out the cooling on respective bobbin blocks according to various environments and conditions. Besides, the adaptability can be improved.

Hereinafter, the operation process of the above described cooling fluid path structure of the present invention will be described with reference to FIGS. 1 to 6.

A cooling fluid, which has been boosted through a cryogenic fluid supply means (e.g., a pump or a blower), is flown into the cooling fluid path inlet 130 (one selected from 130-1, 130-2, . . . 130-12) provided in the respective bobbin blocks 110(110-1, 110-2, . . . 110-6) of the rotor 100 by passing through the fixed inlet fluid path 10 and a plurality of split rotating inlet fluid paths 20(20-1, 20-2, . . . ).

The cooling fluid flown into the cooling fluid path inlet 130 (one selected from 130-1, 130-2, . . . 130-12) cools the rotor 100 while circulating within the respective bobbin blocks 110(110-1, 110-2, . . . 110-6), and then is discharged to the cooling fluid path outlet 130 (selected from 130-1, 130-2, . . . 130-12, except for the one selected as the inlet).

In such a process, the bobbin blocks 110(110-1, 110-2, . . . 110-6) are cooled by the low temperature fluid transferred via a cryogenic fluid supply means or a blower, and thereby, the superconducting wire layered on the bobbin 120 of bobbin blocks 110(110-1, 110-2, . . . 110-6) is conduction-cooled.

The discharged fluid is flown into a plurality of split rotating outlet fluid paths 40(40-1, 40-2, . . . ), and then the fluids of the rotating outlet fluid paths are put together in a single fluid path. Then, the fluid is restored to the fluid supply means via the fixed outlet fluid path 50 surrounding the outside of the fixed inlet fluid path 10.

Although the present invention has been described in the preferred embodiment, it will be understood by those skilled in the art that the spirit and scope should not be limited to the description of the embodiment contained herein, and can be modified and changed within the spirit and scope of the invention.

Accordingly, the above described embodiments are provided to ensure that one skilled in the art will fully understand the present invention, and thus are intended to be illustrative, and not restrictive. Therefore, the present invention is limited only by the scope of claims.

What is claimed is:

1. A cooling fluid path structure for a superconducting rotating machine, which is for cooling a rotor of the superconducting rotating machine by circulating a cooling fluid between a fixed fluid supply means and the rotating rotor, the cooling fluid path structure comprising:

a fixed inlet fluid path fixed together with the fluid supply means, to which the cooling fluid discharged from the fluid supply means is transferred;

a rotating inlet fluid path adjacently connected to an outlet of the fixed inlet fluid path, which is for transferring the cooling fluid transferred from the fixed inlet fluid path to a cooling fluid path inlet provided in the rotor while rotating together with the rotor;

a rotating outlet fluid path rotating together with the rotor, to which the cooling fluid discharged from a cooling fluid path outlet of the rotor is transferred; and a fixed outlet fluid path adjacently connected to the rotating outlet fluid path, which is for transferring the cooling fluid transferred from the rotating outlet fluid path to the fluid supply means while being fixed together with the fluid supply means, wherein the rotating outlet fluid path and the fixed outlet fluid path are disposed in such a manner that they surround outside of the rotating inlet fluid path and the fixed inlet fluid path.

2. The cooling fluid path structure as claimed in claim 1, wherein the rotating outlet fluid path, the fixed outlet fluid path, the rotating inlet fluid path, and the fixed inlet fluid path are concentrically disposed.

3. The cooling fluid path structure as claimed in claim 1, wherein a plurality of inlets for cooling fluid paths coming in the rotor are provided, and the rotating inlet fluid path branches off and transfers the cooling fluid transferred from a single outlet of the fixed inlet fluid path into the plurality of inlets for the cooling fluid paths of the rotor.

4. The cooling fluid path structure as claimed in claim 1, wherein a plurality of outlets for cooling fluid paths coming out of the rotor are provided, and the rotating outlet fluid path receives cooling fluids discharged from the plurality of outlets for the cooling fluid paths of the rotor, and puts together the cooling fluids in a single fluid path.

5. The cooling fluid path structure as claimed in claim 1, further comprising dynamic sealing means for sealing the cooling fluid, which are disposed at an adjacent portion between the fixed inlet fluid path and the rotating inlet fluid path, and at an adjacent portion between the rotating outlet fluid path and the fixed outlet fluid path while fixedly supporting the fixed inlet fluid path and the fixed outlet fluid path and rotatably supporting the rotating inlet fluid path and the rotating outlet fluid path.

* * * * *